United States Patent
Takano et al.

(10) Patent No.: US 10,481,306 B2
(45) Date of Patent: Nov. 19, 2019

(54) DISPLAY PANEL AND METHOD OF MANUFACTURING THE SAME

(71) Applicant: KABUSHIKI KAISHA TOKAI RIKA DENKI SEISAKUSHO, Aichi (JP)

(72) Inventors: Yoshinori Takano, Aichi (JP); Takeshi Fujimoto, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 86 days.

(21) Appl. No.: 15/354,766

(22) Filed: Nov. 17, 2016

(65) Prior Publication Data

US 2017/0160443 A1 Jun. 8, 2017

(30) Foreign Application Priority Data

Dec. 3, 2015 (JP) .................. 2015-236485

(51) Int. Cl.
*G02B 5/00* (2006.01)
*B44C 5/04* (2006.01)
*B44F 1/00* (2006.01)

(52) U.S. Cl.
CPC ............... *G02B 5/003* (2013.01); *B44C 5/04* (2013.01); *B44F 1/00* (2013.01)

(58) Field of Classification Search
CPC . G02B 1/14; G02B 1/10; G02B 1/105; G02B 5/00; G02B 5/003; B44F 1/00; E06B 9/24; Y10T 428/24802; G02F 1/133524; B44C 5/04
USPC .................. 359/242, 275, 609; 428/195.1
See application file for complete search history.

(56) References Cited

U.S. PATENT DOCUMENTS

| | | | | |
|---|---|---|---|---|
| 6,008,877 A | * | 12/1999 | Akiyama | G02F 1/133512 257/753 |
| 8,658,347 B2 | * | 2/2014 | Lee | B29D 11/00365 430/321 |
| 2015/0276988 A1 | * | 10/2015 | Cok | G02B 5/003 428/195.1 |

FOREIGN PATENT DOCUMENTS

| | | | | |
|---|---|---|---|---|
| DE | 4224463 | * | 9/1993 | B41M 1/12 |
| DE | 102004054046 A1 | | 5/2006 | |
| JP | 2009-132099 A | | 6/2009 | |

OTHER PUBLICATIONS

English translation of DE 102004054046, machine translated on May 16, 2018.*

(Continued)

*Primary Examiner* — Jie Lei
(74) *Attorney, Agent, or Firm* — Roberts Mlotkowski Safran Cole & Calderon P.C.

(57) ABSTRACT

A display panel includes a base material that transmits light, a groove portion defined in a back surface of the base material and defined corresponding to a display pattern that is displayed on a front surface side of the base material, a light-blocking film, formed on the back surface where the groove portion is not defined and on a side surface of the groove portion, that blocks light through the back surface, a light-transmissive region that includes a region on an upper surface of the groove portion where the light-blocking film is not formed and that transmits light, and a metal film formed in at least the light-transmissive region.

8 Claims, 2 Drawing Sheets

(56) References Cited

OTHER PUBLICATIONS

Endlish translation of DE 4224463, machine translated on Sep. 21, 2018.*
Extended European Search Report issued in the corresponding EP application No. 16201761.0 dated Apr. 3, 2017.

* cited by examiner

DISPLAY PANEL AND METHOD OF MANUFACTURING THE SAME

The present application is based on Japanese patent application No. 2015-236485 filed on Dec. 3, 2015, the entire contents of which are incorporated herein by reference.

TECHNICAL FIELD

The present invention relates to a display panel and a method of manufacturing the same.

BACKGROUND ART

A transparent synthetic resin molded article in which a pattern is formed in a specified region on a back surface by a flat part and an engraved recessed part formed in an engraved shape by leaving the flat part in the periphery thereof is known as an example of conventional technology (see Patent Document 1, for example).

This decorative synthetic resin molded article has a first decorative layer, constituted of at least one layer of film selected from a coating film, a deposition film, and an in-mold transfer film, on the flat part excluding the engraved recessed part, and a second decorative layer, constituted of at least one layer of film selected from a coating film and a deposition film, superimposed on the first decorative layer in the entire specified region including the flat part and the engraved recessed part.

CITATION LIST

Patent Document

Patent Document 1: Japanese Unexamined Patent Application Publication No. 2009-132099A

SUMMARY OF INVENTION

Technical Problem

However, with the conventional decorative synthetic resin molded article, light entering from the front surface or back surface may be reflected or transmitted by the second decorative layer on side surfaces and an upper surface of the engraved recessed part, causing the pattern to become blurry.

Accordingly, an object of the present invention is to provide a display panel, and a method of manufacturing the same, that can create a superior three-dimensional metal tone decoration.

Solution to Problem

One aspect of the present invention provides a display panel including a base material that transmits light, a groove portion defined in a back surface of the base material and defined on the basis of a display pattern to be displayed on a front surface side of the base material, a light-blocking film, formed on the back surface where the groove portion is not defined and on a side surface of the groove portion, that blocks light from the back surface, a light-transmissive region that is a region on an upper surface of the groove portion where the light-blocking film is not formed and that transmits light, and a metal film formed in at least the light-transmissive region.

Another aspect of the present invention provides a method of manufacturing a display panel, including the steps of defining a groove part in a back surface of a base material on the basis of a display pattern, forming a light-blocking film that blocks light on the back surface and on the groove portion by applying a material of the light-blocking film to the back surface, forming a light-transmissive region that transmits light by removing the light-blocking film from an upper surface of the groove portion, and forming a metal film in at least the light-transmissive region.

Advantageous Effects of Invention

According to the present invention, a superior three-dimensional metal tone decoration can be created.

DESCRIPTION OF EMBODIMENT

Overview of Embodiment

A display panel according to an embodiment is generally configured including: a base material that transmits light; a groove portion defined in a back surface of the base material and defined on the basis of a display pattern to be displayed on a front surface side of the base material; a light-blocking film, formed on the back surface where the groove portion is not defined and on a side surface of the groove portion, that blocks light from the back surface; a light-transmissive region that is a region on an upper surface of the groove portion where the light-blocking film is not formed and that transmits light; and a metal film formed in at least the light-transmissive region.

In this display panel, the light-blocking film on the back surface that will serve as a background of the display pattern is distanced from the metal film in the light-transmissive region that will serve as the display pattern, and thus a three-dimensional decoration can be obtained. Additionally, in the display panel, the light-blocking film is formed on the side surface of the groove portion, which suppresses situations where light entering from the front surface or the back surface of the base material is reflected by the side surface or transmitted through the side surface. Accordingly, compared to a case where there is no light-blocking film on the side surface, the contours of the metal film formed in the light-transmissive region, or in other words, the contours of the display pattern, are clearly defined, and a superior three-dimensional metal tone decoration can be obtained.

Embodiment

Overview of Display Panel 1

Figure 1A:
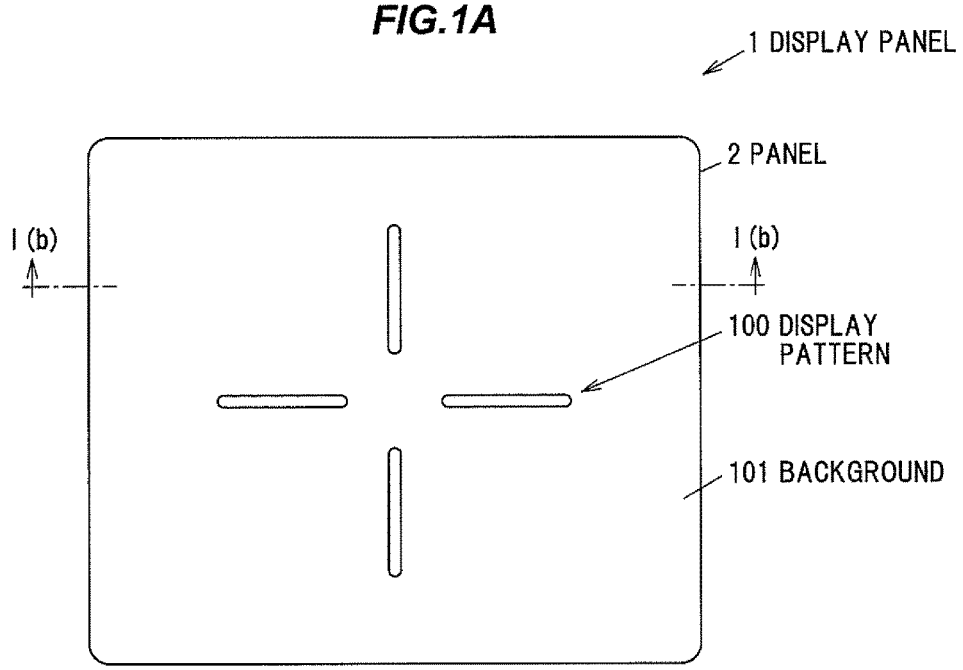
FIG. 1A is a schematic diagram illustrating an example of a display panel according to an embodiment.
Figure 1B:
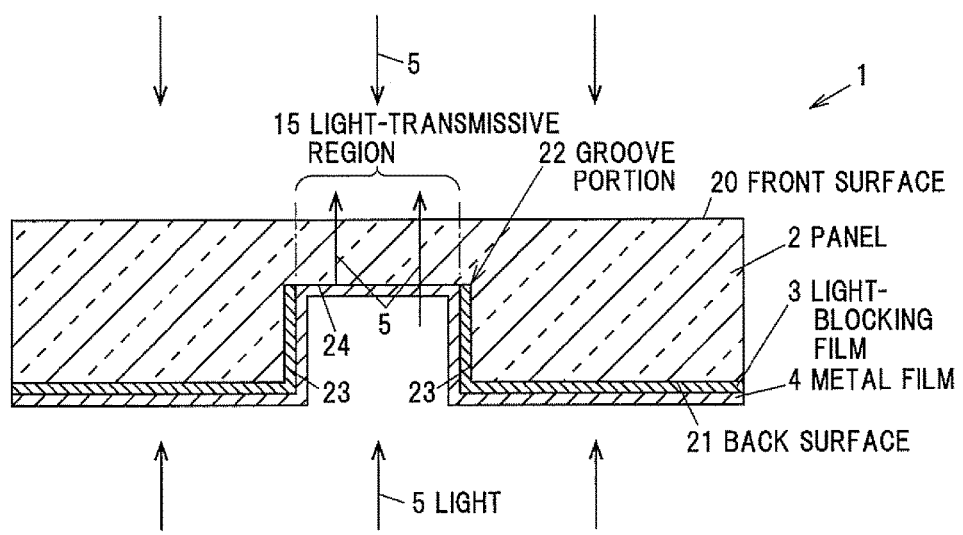
FIG. 1B is an example of a cross-sectional view in which a cross-section of the display panel cut along a line I(b)-I(b) in FIG. 1A is seen from the direction indicated by the arrows in FIG. 1A.

FIG. 1A is a schematic diagram illustrating an example of a display panel according to an embodiment, and FIG. 1B is an example of a cross-sectional view in which a cross-section of the display panel cut along a line I(b)-I(b) in FIG. 1A is seen from the direction indicated by the arrows in FIG. 1A. In the drawings associated with the following embodiment, ratios between elements in the drawings may be different from the actual ratios.

A display panel 1 is, for example, a display panel that displays functions of an electronic device or the like, and is used as a key top of a switch through which touch operations, push operations, and the like are made, as an operation panel for a touch sensor device through which swiping operations, touch operations, and the like are made, or the like.

As illustrated in FIGS. 1A and 1B, the display panel 1 is generally configured including: a panel 2 formed from a light-transmissive base material; a groove portion 22 defined in a back surface 21 of the panel 2 and defined on the basis of a display pattern 100 to be displayed on a front surface 20 side of the panel 2; a light-blocking film 3, formed on the back surface 21 where the groove portion 22 is not defined and on side surfaces 23 of the groove portion 22, that blocks light from the back surface 21; a light-transmissive region 15 that is a region on an upper surface 24 of the groove portion 22 where the light-blocking film 3 is not formed and that transmits light; and a metal film 4 formed in at least the light-transmissive region 15.

Note that "transmitting light" refers to, for example, light traversing and being emitted from an object having a light transmittance of 70% or greater. Meanwhile, "blocking light" refers to, for example, the intensity of light being reduced by an object having a light transmittance of 1% or less. This light may be artificial light or natural light.

Configuration of Panel 2

The panel 2 is formed in a plate shape from a resin having high light transmittance, such as polycarbonate (PC) or polymethyl methacrylate (PMM), from glass, or the like, for example.

The groove portion 22 is defined along the display pattern 100 in the back surface 21 of the panel 2. The light-blocking film 3 is formed on the side surfaces 23 of the groove portion 22. The light-blocking film 3 on the side surfaces 23 suppresses the leakage of light from the side surfaces 23 toward the panel 2, and thus suppresses blurring of the display pattern 100, and a loss of glossiness provided by the metal film 4.

The light-blocking film 3 is removed from the upper surface 24 of the groove portion 22. This removal is carried out in order to form the light-transmissive region 15 on the upper surface 24 of the groove portion 22 and make the metal film 4 visually recognizable when the panel 2 is viewed from above.

The metal film 4 according to the present embodiment transmits light, and thus as illustrated in FIG. 1B, light 5 entering from the front surface 20 side of the panel 2 is almost entirely absorbed by the light-blocking film 3, but some of that light 5 is reflected by the metal film 4 and exits from the panel 2. On the other hand, light 5 entering from the back surface 21 side is almost entirely blocked by the light-blocking film 3, but is emitted from the panel 2 through the metal film 4 in the light-transmissive region 15.

Configuration of Light-blocking Film 3

The light-blocking film 3 is configured to absorb almost all of the light from the front surface 20 side of the panel 2 and the light from the back surface 21 side of the panel 2. Accordingly, a background 101 indicated in FIG. 1A is formed from this light-blocking film 3.

The light-blocking film 3 is black, for example. The light-blocking film 3 is formed by applying a urethane acrylate-based, epoxy acrylate-based, or similar material, for example. The light-blocking film 3 formed on the upper surface 24 of the groove portion 22 is removed using a laser, fir example.

Configuration of Metal Film 4

As described above, the metal film 4 according to the present embodiment is configured to transmit light. The metal film 4 is formed, for example, by depositing a metal material such as aluminum, which makes the film thin and increases the transmittance.

As a modification, the metal film 4 may be formed by depositing a highly-transmissive metal such as indium or tin, depositing zinc oxide (ZnO) or indium tin oxide (ITO), which are used in transparent electrodes, or the like.

However, in the case where the display panel 1 is disposed above the electrodes of an electrostatic capacitance-type touch sensor device and the front surface 20 of the display panel 1 is to serve as an operating surface, a metal film 4 made from a transparent electrode material is unsuitable.

As illustrated in FIG. 1B, this metal film 4 is formed on the light-blocking film 3 and in the light-transmissive region 15 on the upper surface 24 of the groove portion 22 from which the light-blocking film 3 has been removed. The metal film 4 formed in the light-transmissive region 15 forms the display pattern 100. Accordingly, because the panel 2 is a transparent member, the display panel 1 includes the display pattern 100 having a metal tone provided by the metal film 4.

Method of Manufacturing Display Panel 1

FIGS. 2A to 2D are schematic diagrams illustrating an example of a process of manufacturing the display panel according to the embodiment. A method of manufacturing the display panel 1 will be described hereinafter.

Figure 2A:
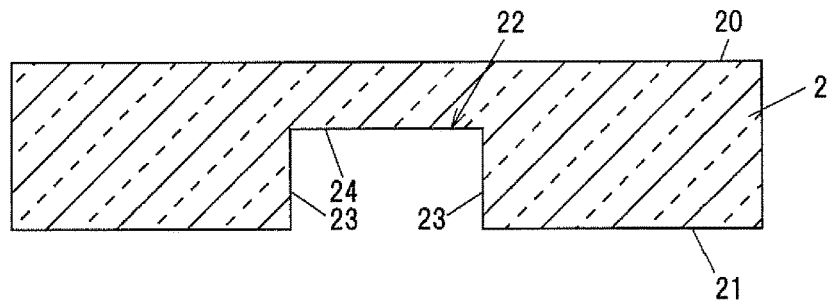
FIGS. 2A to 2D are schematic diagrams illustrating an example of a process of manufacturing the display panel according to the embodiment.

As illustrated in FIG. 2A, the groove portion 22 is defined in the back surface 21 of the panel 2 on the basis of the display pattern 100.

Figure 2B:
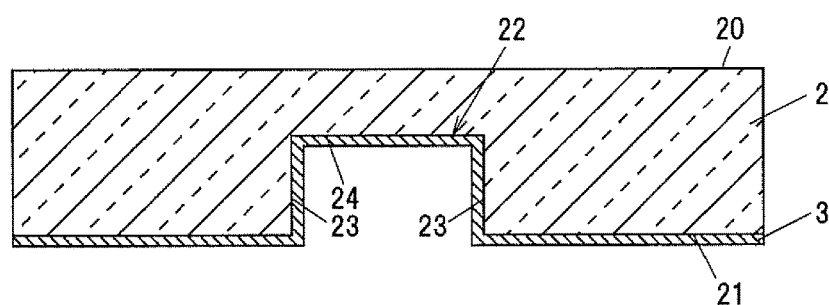

Next, as illustrated in FIG. 2B, the material of the light-blocking film 3 that blocks light is applied to the back surface 21 so as to form the light-blocking film 3 on the back surface 21 and the groove portion 22.

Figure 2C:
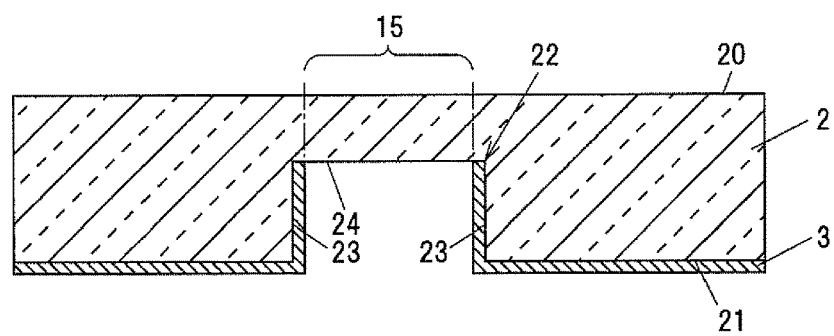

Next, as illustrated in FIG. 2C, the light-blocking film 3 on the upper surface 24 of the groove portion 22 is removed so as to form the light-transmissive region 15 that transmits light. This removal enables the metal film 4, which is formed in the next step, to be visually recognized when the panel 2 is viewed from above.

Figure 2D:
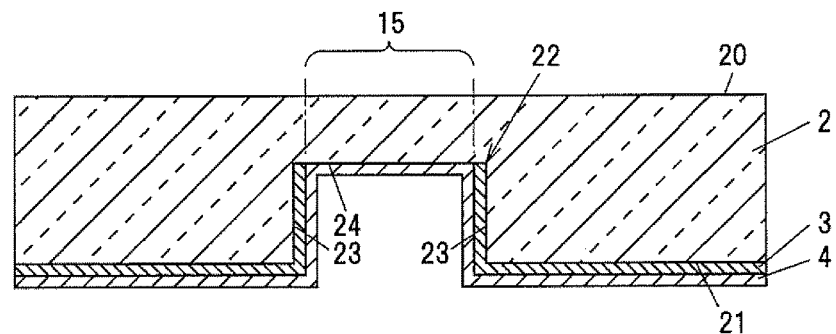

Next, as illustrated in FIG. 2D, the metal film 4 is formed in at least the light-transmissive region 15, and the display panel 1 is obtained as a result. In the present embodiment, the metal film 4 is formed on the light-blocking film 3 as well as in the light-transmissive region 15.

Effects of Embodiment

The display panel 1 according to the present embodiment can create a superior three-dimensional metal tone decoration. Specifically, in the display panel 1, the light-blocking film 3 on the back surface 21 that will serve as the background 101 of the display pattern 100 is distanced from the metal film 4 in the light-transmissive region 15 that will serve as the display pattern 100, and thus a three-dimensional decoration can be obtained. Additionally, in the display panel 1, the light-blocking film 3 is formed on the side surfaces 23 of the groove portion 22, which suppresses situations where light entering from the front surface 20 or the back surface 21 of the panel 2 is reflected by the side surfaces 23 or transmitted through the side surfaces 23. Accordingly, compared to a case where there is no light-blocking film on the side surfaces, the contours of the metal film 6 formed in the light-transmissive region 15, or in other words, the contours of the display pattern 100, are clearly defined, and a superior three-dimensional metal tone decoration can be obtained.

Meanwhile, in a display panel 1 serving as a modification, even if the metal film 4 does not transmit light, light entering from the front surface 20 side of the panel 2 is absorbed by the light-blocking film 3 and is reflected by the metal film 4 in the light-transmissive region 15. Accordingly, a three-dimensional metal tone decoration can be obtained even without illumination from the back surface 21 side.

Although several embodiments of the present invention and modifications thereof have been described above, these embodiments and variations are merely examples, and the invention according to claims is not intended to be limited thereto. Such novel embodiments and modifications can be implemented in various other forms, and various omissions, substitutions, changes, and the like can be made without departing from the spirit and scope of the present invention. In addition, all combinations of the features described in these embodiments and modifications are not necessary to solve the problem. Furthermore, these embodiments and modifications are included within the spirit and scope of the invention and also within the invention described in the claims and the scope of equivalents thereof.

The invention claimed is:

1. A display panel, comprising:
    a base material that transmits light and that is formed in a plate shape;
    a groove portion defined in a back surface of the base material and defined corresponding to a display pattern that is displayed on a front surface side of the base material;
    a light-blocking film, formed on the back surface where the groove portion is not defined and on a side surface of the groove portion, that blocks light through the back surface;
    a light-transmissive region that comprises a region on an upper surface of the groove portion where the light-blocking film is not formed and that transmits light; and
    a metal film formed in at least the light-transmissive region,
    wherein the metal film overlies the light-blocking film, and is of such a thickness that it transmits light,
    wherein the light-blocking film is configured to reduce an intensity of light transmitted therethrough, and
    wherein the light-blocking film is configured to have a light transmittance of not more than 1%.

2. The display panel according to claim 1, wherein the light-blocking film suppresses reflection of light entering through the front surface side of the base material.

3. The display panel according to claim 1, wherein the light-blocking film is formed covering an entirety of the side surface of the groove portion.

4. The display panel according to claim 1, wherein the upper surface of the groove portion is parallel to a front surface of the base material.

5. The display panel according to claim 1, wherein the metal film on the light-transmissive region is more than a half of a thickness of the base material away from the light-blocking film on the back surface.

6. The display panel according to claim 1, wherein the light-blocking film is formed covering only one or more side surfaces of the groove portion.

7. The display panel according to claim 1, wherein the light-blocking film is formed covering an entirety of opposing side surfaces of the groove portion.

8. A method of manufacturing a display panel, comprising:
    defining a groove portion in a back surface of a base material corresponding to a display pattern, the base material being formed in a plate shape;
    forming a light-blocking film that blocks light on the back surface and on the groove portion by applying a material of the light-blocking film to the back surface such that the light-blocking film covers an entirety of the back surface;
    forming a light-transmissive region that transmits light by removing the light-blocking film on an upper surface of the groove portion; and
    forming a metal film in at least the light-transmissive region of such a thickness that it transmits light,
    wherein the light-blocking film is configured to reduce an intensity of light transmitted therethrough, and
    wherein the light-blocking film is configured to have a light transmittance of not more than 1%.

* * * * *